July 20, 1965  H. S. PIEN  3,195,353
DIAPHRAGM TYPE FLUID PRESSURE TRANSDUCER
Filed April 24, 1961  2 Sheets-Sheet 1

Hsia S. Pien
INVENTOR
BY Edward A. Hathaway
ATTORNEY

July 20, 1965 H. S. PIEN 3,195,353
DIAPHRAGM TYPE FLUID PRESSURE TRANSDUCER
Filed April 24, 1961 2 Sheets-Sheet 2

Hsia S. Pien
INVENTOR
BY Edward T. Hathaway
ATTORNEY

United States Patent Office 3,195,353
Patented July 20, 1965

3,195,353
DIAPHRAGM TYPE FLUID PRESSURE
TRANSDUCER
Hsia S. Pien, Newton, Mass., assignor to Baldwin-Lima-
Hamilton Corporation, a corporation of Pennsylvania
Filed Apr. 24, 1961, Ser. No. 104,989
4 Claims. (Cl. 73—398)

This invention relates to force responsive transducers and particularly to diaphragm-type fluid pressure transducers and more particularly to one employing bonded electric resistance filament strain gages.

Many attempts have heretofore been made to make diaphragm-type fluid pressure transducers wherein a diaphragm acts against a strain sensitive element upon which are mounted well-known bonded filament type electric strain gages for measuring strain in the element in response to pressures exerted on the diaphragm. Such diaphragm devices inherently have the problem of the pressure load being divided between the sensing element and the casing containing such element, this for the reason that the peripheral portion of the diaphragm must be secured to the casing. Inasmuch as the fluid pressure acts over the entire area of the diaphragm, it is seen that an appreciable portion, sometimes as high as 40% or more, of the entire pressure load is transmitted to the casing. To diminish this effect, it has been heretofore proposed to use special types of diaphragms but these have not been entirely satisfactory. The problem is further complicated by the fact that if the strain sensing element has a large deflection when subjected to load, the diaphragm will be excessively flexed so as to cause a further redistribution of load between the sensing element and surrounding casing. This shifting distribution of the load between the sensing element and casing is, of course, present in the operation of any diaphragm, but it is desirable to minimize such shifting for the sake of accuracy. Another disadvantage with strain sensing elements that have large deflection is their low natural frequency but the advantage of such a sensing element is that it insures a higher degree of electrical output of the bonded strain gages than is possible with sensing elements that have very small deflection. A sensing element of large deflection is also liable to have a higher degree of non-linearity of electrical output vs. deflection than is desired.

It is an object of my invention to provide an improved diaphragm pressure transducer that has the many advantages of the prior devices as above mentioned while reducing to a minimum, if not eliminating, the many disadvantages thereof.

Another object is to provide an improved diaphragm pressure transducer that has a low displacement or deflection of the strain sensing element but at the same time obtaining a high electrical voltage output for a given deflection together with a high degree of linearity between electrical output vs. deflection and yet is compact in size and easy to gage without requiring sub-miniaturization of the gages.

A further object is to provide such an improved diaphragm pressure transducer that is relatively simple and economical in construction, operation and maintenance and readily lends itself to be of the flush diaphragm type.

Other objects and advantages will be more apparent to those skilled in the art from the following description of the accompanying drawings in which.

Figure 1:
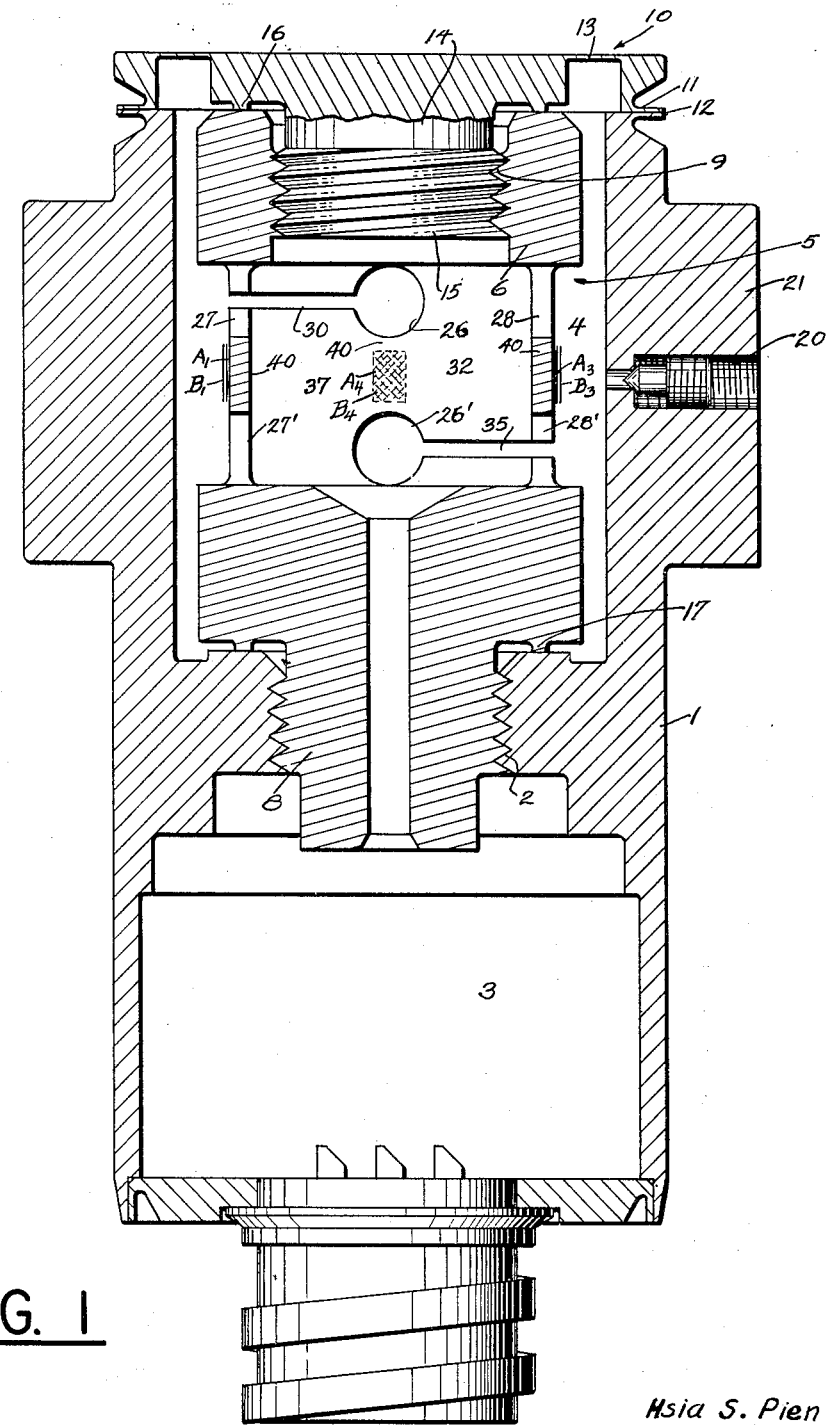
FIG. 1 is a greatly enlarged sectional view of my improved device.
Figure 2:
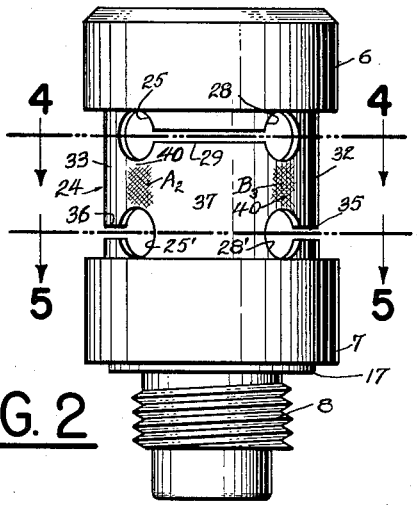
FIG. 2 is a side elevation of the strain sensitive element removed from the assembled device.
Figure 4:
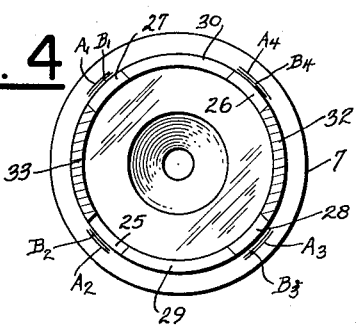
Figure 5:
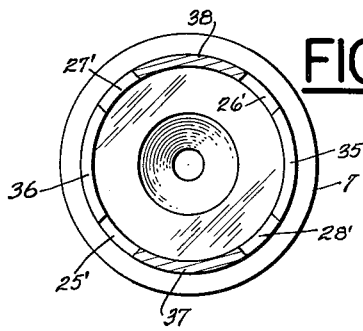
Figure 6:
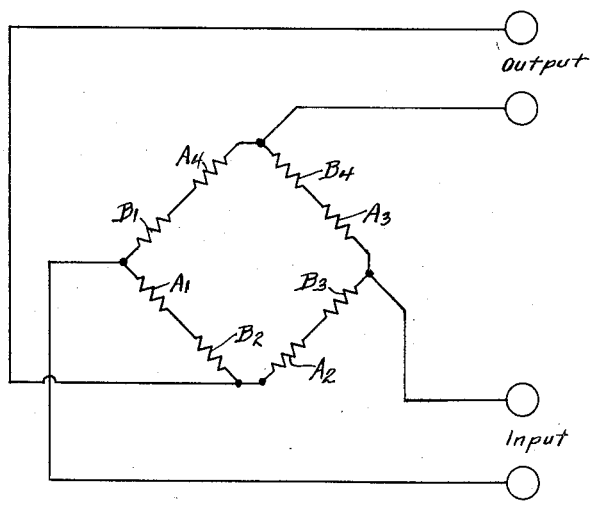

FIGS. 4 and 5 are sectional views taken respectively on the lines 4—4 and 5—5 of FIG. 2; and FIG. 6 is a diagrammatic wiring diagram showing how the gages are connected into a Wheatstone measuring circuit.

In the particular embodiment of the invention disclosed herein I have shown a hollow casing 1, preferably circular in cross section, having a threaded reduced bore 2 connecting an electrical terminal chamber 3 with a bore 4 in which a strain sensing element generally indicated at 5 is disposed. This element has relatively heavy upper and lower load transmitting portions 6 and 7 the latter of which has a stem 8 threaded in opening 2. The upper member 6 has a threaded opening 9. Fluid pressure force is transmitted to the sensing element 5 by a diaphragm generally indicated at 10 mounted on top of casing 1 as by an annular flange 11 which is soldered or otherwise secured at a seam 12 with casing 1. This diaphragm has a relatively thin annular flexure portion 13 connecting the peripheral portion with a relatively heavy section 14 which is rigidly secured to the strain sensing element by a stem 15 threaded in opening 9. To insure maximum uniformity of connection of members 14 and 6 as well as between member 7 and casing 1, narrow annular seating rings 16 and 17 are provided. To minimize temperature effects on the strain sensing element a customary vacuum connection 20 is provided in a supporting flange 21 of the casing. It will be understood that this flange is seated and held in a bore of a pressure vessel or other structure where fluid pressure within the vessel or against the surface of the structure is to be measured.

Figure 3:
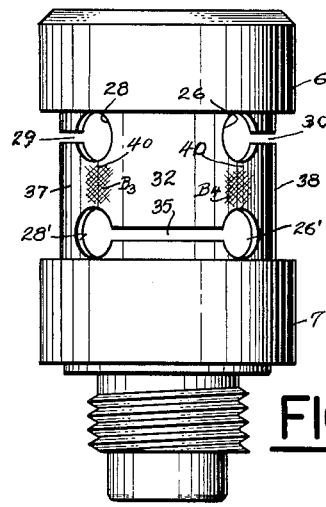
FIG. 3 is a view similar to FIG. 2 but rotated 90° therefrom or, as if viewing FIG. 2 from the right side thereof.

To obtain the many advantages of diaphragm type transducers as heretofore mentioned, while minimizing or eliminating the disadvantages thereof, as well as obtaining ease of application of the strain gages, compactness, high electrical output, and a high degree of linearity, my strain-sensing element 5 has an annular wall 24 extending axially between and connecting the upper and lower members 6 and 7 preferably by being formed integrally therewith. The thickness of this annular wall may be determined in accordance with the pressure capacity of the cell. As shown in FIG. 2, I drill two holes 25 and 26 across the diameter of the annular wall and at 90° thereto I drill another pair of holes 27 and 28. The holes 25 and 28, and 26 and 27 are then connected by transverse slots 29 and 30. These holes and slots have their center lines lying in a common plane normal to the axis of the annular wall 24. Thus, this arrangement of slots and holes provides load transmitting wall portions 32 and 33, solidly connected to the upper member 6, extending axially downward to another set of slots 35 and 36 formed by providing radial holes 25', 26', 27' and 28' in the identical manner as are the upper set of holes and slots but rotated 90° therefrom. This is shown in FIG. 3. This arrangement also provides load transmitting wall portions 37 and 38 extending axially beneath the upper set of slots 29 and 30 and solidly connected to the lower member 7. One set of load transmitting wall portions are thus circumferentially offset from the other set and the two sets extend in axially opposite directions.

Thus, a pressure load imposed upon diaphragm 10 will be transmitted downwardly from head 6 through solidly connected side portions 32, 33, FIG. 3, and thence across lateral connecting areas 40 located between the superimposed upper and lower holes 28, 28' and 26, 26'. The force then continues downwardly through the portions 37, 38, FIG. 2, to the lower head 7. It will be understood that areas similar to 40 are also on the back side of the sensing element so that there are four such lateral connecting areas spaced equally apart in a circumferential direction. As a result of this arrangement the areas 40 are subjected to shear strains and I utilize this condition to obtain not only ease of gage application but also a high electrical output for a given deflection of the sensing element by employing at each area two bonded filament strain gages with their filaments extending at 90° to each other and at 45° to the vertical axis of the element. There are thus eight gages which in FIG. 4 are indicated at A1 to A4 and B1 to B4 for measuring the shear strains in said areas. The gages are disposed in a Wheatstone bridge as shown in FIG. 6 so that their outputs are cumulative.

As a result of my improved construction the strain sensitive element 5 can have minimum deflection so as to reduce the shifting of the effective area of the diaphragm. I am able to obtain a high electrical output of three millivolts per volt and obtain a high degree of linearity. Because of the minimum deflection of the sensing element I obtain a high natural frequency. In addition the device can be made extremely compact in size which in actual practice has been made with a diameter at the diaphragm end of 1 3/16" and a maximum overall length of 2 1/8". The strain sensing element between the heads 6 and 7 has a diameter of 7/10" and an axial length of 7/16". Notwithstanding such compacts size I can avoid using subminiaturized strain gages because the gages are mounted on the outer cylindrical surface of the sensitive portion of the shear areas 40, rather than being mounted within small holes or other generally inaccessible areas. Due to this ease of gaging while at the same time measuring the shear forces by the diagonal gages I am able to produce the device relatively economically. Thus, I have provided an extremely effective fluid pressure transducer of the diaphragm type which has a high electrical output, a high degree of linearity, compactness in size, and ease in gaging, all combined with a low displacement of the strain sensitive element with consequent high natural frequency.

It will, of course, be understood that various changes in details of construction and arrangement of parts may be made by those skilled in the art without departing from the spirit of the invention as set forth in the appended claims.

I claim:

1. A fluid pressure transducer comprising, in combination, a casing having an axially extending chamber, a strain-sensitive element extending axially within said chamber and supported at one end by said casing, a diaphragm connected to the other end of said sensitive element and extending radially therefrom for connection to said casing so that fluid pressure acting on said diaphragm compresses the sensitive element in an axial direction, said sensitive element having a load transmitting portion extending axially from the diaphragm end of the sensitive element toward its other end but spaced from such other end and another load-transmitting portion extending axially from such other end of the sensing element toward the diaphragm end but spaced from said diaphragm end, said load-transmitting portions being circumferentially offset from each other but connected together by lateral portions which are subjected to shear strains when load is transmitted through the sensitive element, said lateral portions having surfaces extending axially at the sites of their connections with said load-transmitting portions for distances sufficient to accommodate strain gages thereon, and shear responsive strain gages mounted on said surfaces of said lateral portions at said sites so as to be responsive to load forces imposed upon said sensitive element by fluid pressure acting on said diaphragm.

2. A fluid pressure transducer comprising, in combination, a casing having an axially extending chamber, a strain-sensitive element extending axially within said chamber and supported at one end by said casing, a diaphragm connected to the other end of said sensitive element and extending radially therefrom for connection to said casing so that fluid pressure acting on said diaphragm compresses the sensitive element in an axial direction, said sensitive element having a load transmitting portion extending axially from the diaphragm end of the sensitive element toward its other end but spaced from such other end and another load-transmitting portion extending axially from such other end of the sensing element toward the diaphragm end but spaced from such diaphragm end, said load-transmitting portions being circumferentially offset from each other but connected together by lateral portions which are subject to shear strains when load is transmitted through the sensitive element, said lateral portions having axially extending surfaces, and shear responsive strain gages mounted on said surfaces so as to be responsive to load forces imposed upon said sensitive element by fluid pressure acting on said diaphragm, said sensing element comprising an axially extending annular wall, the load transmitting portions thereof being formed by a pair of slots extending through the wall for partial distances around the wall axis, said slots being formed near one end of the sensitive element at diametrically opposite points thereof, and another similar pair of slots in the wall located near the other end of the sensitive element but circumferentially offset from the first set of slots by approximately 90°, and the ends of the upper and lower slots being in substantially axial alignment thereby providing areas subject to shear strains.

3. A fluid pressure transducer comprising, in combination, a casing having an axially extending chamber, a strain-sensitive element extending axially within said chamber and supported at one end by said casing, a diaphragm connected to the other end of said sensitive element and extending radially therefrom for connection to said casing so that fluid pressure acting on said diaphragm compresses the sensitive element in an axial direction, said sensitive element having a load transmitting portion extending axially from the diaphragm end of the sensitive element toward its other end but spaced from such other end and another load-transmitting portion extending axially from such other end of the sensing element toward the diaphragm end but spaced from such diaphragm end, said load-transmitting portions being circumferentially offset from each other but connected together by lateral portions which are subjected to shear strains when load is transmitted through the sensitive element, said lateral portions having axially extending surfaces, and shear responsive strain gages mounted on said surfaces so as to be responsive to load forces imposed upon said sensitive element by fluid pressure acting on said diaphragm, said sensing element comprising an axially extending annular wall, the load transmitting portions thereof being formed by a pair of slots extending through the wall for partial distances around the wall axis, said slots being formed near one end of the sensitive element at diametrically opposite points thereof, another similar pair of slots in the wall located near the other end of the sensitive element but circumferentially offset from the first set of slots by approximately 90°, and the ends of the upper and lower slots being in substantially axial alignment thereby providing areas subject to shear strains, and the shear responsive strain gages being mounted on the exterior surface of said wall in said shear responsive areas.

4. A force responsive transducer element comprising, in combination, upper and lower heads spaced apart along a common axis, an axially extending annular wall interposed between said heads to transmit load between the same, said wall having an upper set of a plurality of circumferentially spaced load transmitting portions extending axially from the upper head toward the lower head but axially spaced therefrom and a lower set of a plurality of circumferentially spaced load transmitting portions extending axially from the lower head toward the upper head but axially spaced from the latter, said upper and lower sets of load transmitting portions being circumferentially offset from each other but connected together by lateral portions which are subjected to shear strains when load is transmitted from one head to the other, said lateral portions having circumferential surfaces extending axially at the sites of their connections with said load transmitting portions for distances sufficient to accommodate strain gages thereon, and shear responsive strain gages mounted on said surfaces of said lateral portions at said sites so as to be responsive to shear strains induced by load force transmitted between said heads.

References Cited by the Examiner

UNITED STATES PATENTS

| | | | |
|---|---|---|---|
| 2,803,134 | 8/57 | Ward | 73—141 |
| 2,811,855 | 11/57 | Kotas | 73—88.5 |
| 2,920,299 | 1/60 | Lent | 73—398 X |
| 3,004,231 | 10/61 | Laimins | 338—5 |
| 3,024,649 | 3/62 | Taber | 73—406 |

OTHER REFERENCES

Page 81, March-April 1951, "Electric Strain Gauges and the Practical Applications Thereof," Neuweiler, vol. V, No. 2, Figure 12.

RICHARD C. QUEISSER, *Primary Examiner*.

ROBERT EVANS, JOSEPH P. STRIZAK, *Examiners*.